US011882618B2

(12) United States Patent
Xu et al.

(10) Patent No.: US 11,882,618 B2
(45) Date of Patent: *Jan. 23, 2024

(54) RRC CONNECTION MANAGEMENT METHOD AND APPARATUS, AND DEVICE

(71) Applicant: Huawei Technologies Co., Ltd., Shenzhen (CN)

(72) Inventors: Xiaoying Xu, Shenzhen (CN); Xiaoxiao Zheng, Shanghai (CN); Tianle Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,442

(22) Filed: Jun. 16, 2022

(65) Prior Publication Data

US 2022/0312541 A1  Sep. 29, 2022

Related U.S. Application Data

(63) Continuation of application No. 17/061,059, filed on Oct. 1, 2020, now Pat. No. 11,382,168, which is a
(Continued)

(51) Int. Cl.
*H04W 76/27* (2018.01)
*H04W 64/00* (2009.01)
(Continued)

(52) U.S. Cl.
CPC .......... *H04W 76/27* (2018.02); *H04W 12/08* (2013.01); *H04W 64/003* (2013.01);
(Continued)

(58) Field of Classification Search
None
See application file for complete search history.

(56) References Cited

U.S. PATENT DOCUMENTS

2012/0163296 A1  6/2012  Cheon et al.
2013/0015953 A1  1/2013  Hsu et al.
(Continued)

FOREIGN PATENT DOCUMENTS

CN   102158959 A   8/2011
CN   103339967 A   10/2013
(Continued)

OTHER PUBLICATIONS

Author Unknown, RRC Connection Suspend and Resume, Doc. No. R2-156395, pp. 1-11 Nov. 20, 2015.*
(Continued)

*Primary Examiner* — Christopher M Crutchfield
(74) *Attorney, Agent, or Firm* — Leydig, Voit & Mayer, Ltd.

(57) ABSTRACT

Embodiments of the present disclosure relate to the field of communications technologies, and provide an RRC connection management method and apparatus, and a device. The method includes: sending, by UE when in an RRC idle mode, an uplink data request to an access network node by using a shared data sending resource, where the uplink data request includes uplink data and request information that is used for requesting to enter an RRC connected mode; and receiving, by the UE, an access network dedicated identifier of the UE from the access network node, where the access network dedicated identifier of the UE is determined by the access network node according to the request information, and the UE is in the RRC connected mode within a validity period of the access network dedicated identifier of the UE.

24 Claims, 6 Drawing Sheets

Related U.S. Application Data continuation of application No. 15/990,323, filed on May 25, 2018, now Pat. No. 10,813,160, which is a continuation of application No. PCT/CN2015/095669, filed on Nov. 26, 2015.

(51) Int. Cl.
| | | |
|---|---|---|
| *H04W 68/00* | (2009.01) | |
| *H04W 72/21* | (2023.01) | |
| *H04W 76/10* | (2018.01) | |
| *H04W 12/08* | (2021.01) | |

(52) U.S. Cl.
CPC ......... *H04W 68/005* (2013.01); *H04W 72/21* (2023.01); *H04W 76/10* (2018.02)

(56) References Cited

U.S. PATENT DOCUMENTS

| | | |
|---|---|---|
| 2013/0223370 A1 | 8/2013 | Larmo et al. |
| 2014/0286243 A1 | 9/2014 | Yamada |
| 2014/0313978 A1 | 10/2014 | Tajima et al. |
| 2015/0043455 A1 | 2/2015 | Miklös et al. |
| 2015/0173121 A1 | 6/2015 | Miklös et al. |
| 2016/0014815 A1 | 1/2016 | Vajapeyam et al. |
| 2016/0066296 A1 | 3/2016 | Su et al. |
| 2016/0081115 A1 | 3/2016 | Pang et al. |
| 2016/0157208 A1 | 6/2016 | Liang et al. |
| 2016/0212661 A1 | 7/2016 | Basu Mallick et al. |
| 2016/0227502 A1 | 8/2016 | Vos et al. |
| 2017/0055301 A1 | 2/2017 | Choi |
| 2017/0126574 A1 | 5/2017 | Goel et al. |
| 2017/0181123 A1 | 6/2017 | Schliwa-Bertling et al. |

FOREIGN PATENT DOCUMENTS

| | | |
|---|---|---|
| CN | 104025670 A | 9/2014 |
| EP | 2757856 A1 | 7/2014 |
| KR | 1018078170000 A | 1/2018 |

OTHER PUBLICATIONS

Author Unknown, RRC aspects in NB-IoT, Doc. No. R2-156425, pp. 1-19, Nov. 20, 2015.*
Author Unknown, Discussion on user plane solution of AS context reuse for NB-IOT, pp. 1-6, Doc No. R2-156350, Nov. 20, 2015.*
Author Unknown, Work on user plane based solution with AS information stored in RAN, Doc. No. R2-156424, pp. 1-12, Nov. 20, 2015.*
3rd Generation Partnership Project; Technical Specification Group Services and System Aspects; General Packet Radio Service (GPRS) enhancements for Evolved Universal Terrestrial Radio Access Network (E-UTRAN) access Release 8), 3GPP TS 23.401 V8.6.0, pp. 1-227, 3rd Generation Partnership Project, Valbonne, France (Jun. 2009).
RRC Connection Suspend and Resume, 3GPP TSG-RAN WG2 #92,Anaheim, USA, R2-156395, pp. 1-11, 3rd Generation Partnership Project, Valbonne, France (Nov. 16-20, 2015).
3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.7.0, pp. 1-453, 3rd Generation Partnership Project, Valbonne, France (Sep. 2015).
Random Access Procedure for NB-IoT, 3GPP TSG-RAN WG2 #91 BIS, R2-154462, Malmo, Sweden, 3rd Generation Partnership Project, Valbonne, France (Oct. 5-9, 2015).
3rd Generation Partnership Project; Technical Specification Group Services and System Aspects; Architecture Enhancements for Cellular Internet of Things (Release 13), 3GPP TR 23.720 V1.2.0, pp. 1-96, 3rd Generation0artnership Project, Valbonne, France (Nov. 2015).
Discussion on user plane solution of AS context reuse for NB-IOT, 3GPP TSG-RAN WG2 Meeting #92, R2-156350, Anaheim, USA, 3rd Generation Partnership Project, Valbonne, France (Nov. 2015).
"Text Proposal on RACH based Small data transmission," 3GPP TSG RAN WG2 Meeting #83, Barcelona, Spain, XP050718296, R2-132735, 3rd Generation Partnership Project, Valbonne, France (Aug. 19-23, 2013).
"Text Proposal to TR 37.869 for agreements regarding SDDTE," 3GPP TSG-RAN WG2 Meeting #83, Barcelona, Spain, XP050718732, R2-133036, 3rd Generation Partnership Project, Valbonne, France (Aug. 2013).
"RRC aspects in NB-IoT",3GPP TSG_RAN2 Meeting #92,Anaheim, USA, XP051024539 R2-156425, 3rd Generation Partnership Project, Valbonne, France (Nov. 2015).
"RRC Connection Suspend and Resume, 3GPP TSG-RAN WG2 #92," Nov. 20, 2015, pp. 1-11, 3rd Generation Partnership Project, Valbonne, France (2015).
"Discussion on user plane solution of AS context reuse for NB-IOT," 3GPP TSG-RAN WG2 #92, Anaheim, USA, XP051005808, pp. 1-4, 3rd Generation Partnership Project, Valbonne, France (Nov. 16-20, 2015).
"Work on user plane based solution with AS information stored in RAN," 3GPP TSG-RAN WG2 #92, Anaheim, USA, R2-156424, pp. 1-12, 3rd Generation Partnership Project, Valbonne, France (Nov. 16-20, 2015).
"Suspend/resume functionality for LWA," 3GPP TSG-RAN WG2 #92, Anaheim, USA, R2-163574, pp. 1-3, 3rd Generation Partnership Project, Valbonne, France (Nov. 16-20, 2015).
U.S. Appl. No. 17/061,059, filed Oct. 1, 2020.
U.S. Appl. No. 15/990,323, filed May 25, 2018.

* cited by examiner

RRC CONNECTION MANAGEMENT METHOD AND APPARATUS, AND DEVICE

CROSS-REFERENCE TO RELATED APPLICATIONS

This application is a continuation of U.S. application Ser. No. 17/061,059, filed on Oct. 1, 2020, which is a continuation of U.S. application Ser. No. 15/990,323, filed on May 25, 2018, now U.S. Pat. No. 10,813,160, which is a continuation of International Application No. PCT/CN2015/095669, filed on Nov. 26, 2015. All of the afore-mentioned patent applications are hereby incorporated by reference in their entireties.

TECHNICAL FIELD

Embodiments of the present disclosure relate to the field of communications technologies, and in particular, to a radio resource control (RRC) connection management method and apparatus, and a device.

BACKGROUND

With popularity of intelligent terminal devices such as smartphones, various machine-to-machine (M2M) services such as intelligent meter reading, intelligent transportation, and intelligent health care have been widely applied. This type of service has particular regularity. For example, a small data volume is transmitted each time, a time interval for each transmission is fixed, and when no service data is transmitted, the devices are in an idle mode.

For the foregoing small packet transmission scenario, to improve data transmission efficiency and reduce a large amount of signaling overheads caused by bearer establishment, a solution in which user equipment (UE) switches from an RRC idle mode to an RRC connected mode is provided in the prior art. A specific solution is as follows: When UE switches from the RRC connected mode to the RRC idle mode, a base station instructs the UE to store context information of an RRC connection, and notifies the UE of an identifier that is used for instructing to resume establishment of the RRC connection. In addition, the base station stores context information of an S1 interface between the base station and a core network, and instructs a mobility management entity (MME) to activate a data path between the mobility management entity and a gateway (GW). When the UE needs to transmit uplink service data to the base station, the UE initiates a random access process, to send an RRC connection resume request to the base station in a form of an RRC message. The RRC connection resume request carries the foregoing identifier that is used for instructing to resume establishment of the RRC connection. After receiving the RRC connection resume request, the base station resumes the RRC connection to the UE, and instructs the MME to resume the data path between the MME and the GW. Subsequently, the UE sends uplink service data to the base station by using the resumed RRC connection. In addition, after receiving the foregoing RRC message, the base station activates an original security parameter (that is, a security parameter previously used by the UE in the RRC connected mode). The UE and the base station use the original security parameter to perform security protection on service data.

However, in the foregoing solution provided in the prior art, the UE requests, by using the RRC message in a process in which the UE switches from the RRC idle mode to the RRC connected mode, the base station to resume the RRC connection, and signaling interaction of a large quantity of steps is needed between the UE and the base station to resume data transmission, thereby causing low efficiency.

SUMMARY

To resolve the problem in the prior art, embodiments of the present disclosure provide an RRC connection management method and apparatus, and a device. The technical solutions are as follows:

According to a first aspect, an RRC connection management method is provided. The method includes: sending, by UE when in an RRC idle mode, an uplink data request to an access network node by using a shared data sending resource, where the uplink data request includes uplink data and request information that is used for requesting to enter an RRC connected mode; and receiving, by the UE, an access network dedicated identifier of the UE from the access network node, where the access network dedicated identifier of the UE is determined by the access network node according to the request information, and the UE is in the RRC connected mode within a validity period of the access network dedicated identifier of the UE.

The UE sends, when in the RRC idle mode, the uplink data request to the access network node by using the shared data sending resource, where the uplink data request includes both the uplink data and the request information that is used for requesting to enter the RRC connected mode, so that the access network node establishes an RRC connection to the UE according to the request information. This resolves the problem of low efficiency in the solution provided in the prior art. The problem is caused because the UE requests, in a process in which the UE switches from the RRC idle mode to the RRC connected mode, a base station to resume the RRC connection by using an RRC message, and signaling interaction of a large quantity of steps is needed between the UE and the base station to resume data transmission. The UE requests to enter the RRC connected mode while sending the uplink data, thereby reducing signaling overheads required for establishing or resuming an RRC connection, and achieving a technical effect of rapidly and efficiently establishing or resuming an RRC connection.

In a first possible implementation of the first aspect, the request information includes: a non-access stratum identifier (NAS ID) of the UE and first indication information that is used for requesting to establish an RRC connection.

When the UE in the RRC idle mode needs to transmit uplink data, the UE requests to establish an RRC connection while sending the uplink data to the access network node, thereby implementing rapid and efficient data sending and connection establishment.

With reference to the first possible implementation of the first aspect, in a second possible implementation of the first aspect, before the sending, by UE, an uplink data request to an access network node by using a shared data sending resource, the method further includes: negotiating, by the UE, with a core network node on a first security parameter and a second security parameter, where the first security parameter is used for performing security protection on the uplink data, and the second security parameter is used for performing security protection on NAS signaling; and performing, by the UE, security protection on the uplink data by using the first security parameter.

The UE negotiates with the core network node on the first security parameter, and performs security protection on the uplink data by using the first security parameter, thereby ensuring security of the uplink data.

In a third possible implementation of the first aspect, the request information includes: the access network dedicated identifier used by the UE in the RRC connected mode before entering the RRC idle mode and second indication information that is used for resuming an RRC connection.

When the UE in the RRC idle mode needs to transmit uplink data, the UE requests to resume an RRC connection while sending the uplink data to the access network node, thereby implementing rapid and efficient data sending and connection resumption.

With reference to the third possible implementation of the first aspect, in a fourth possible implementation of the first aspect, before the sending, by UE, an uplink data request to an access network node by using a shared data sending resource, the method further includes: negotiating, by the UE in the RRC connected mode before entering the RRC idle mode, with the access network node on a target security parameter to be used next time the UE enters the RRC connected mode, where the target security parameter has not been used previously in the RRC connected mode; and performing, by the UE, security protection on the uplink data by using the target security parameter.

The UE negotiates, when in the RRC connected mode, with the access network node on the target security parameter to be used next time the UE enters the RRC connected mode, and the target security parameter has not been used previously in the RRC connected mode, thereby ensuring that a different security parameter is used each time in the RRC connected mode to protect data, and implementing secure connection resumption. Compared with the prior art in which an original security parameter is still used to protect data after an RRC connection is resumed, the solution provided in this embodiment has higher security.

With reference to the first aspect or any possible implementation of the first aspect, in a fifth possible implementation of the first aspect, the method further includes: sending, by the UE, an identifier re-determining request to the access network node if the UE moves outside n cells corresponding to the access network dedicated identifier of the UE within the validity period of the access network dedicated identifier of the UE. The access network dedicated identifier of the UE is unique in the n cells, and n is a positive integer. The identifier re-determining request is used for requesting the access network node to re-determine the access network dedicated identifier of the UE. The identifier re-determining request and the uplink data are jointly sent, or the identifier re-determining request is sent in a form of a media access control (MAC) layer control packet.

In the foregoing manner, availability of the RRC connection is still effectively ensured if the UE moves between cells.

With reference to the first aspect or any possible implementation of the first aspect, in a sixth possible implementation of the first aspect, the receiving, by the UE, an access network dedicated identifier of the UE from the access network node includes: receiving, by the UE, an acknowledge response from the access network node. The acknowledge response is used for indicating that the access network node acknowledges that the uplink data has been received, and the acknowledge response includes the access network dedicated identifier of the UE or the access network dedicated identifier of the UE and security parameter acknowledge information.

The access network dedicated identifier of the UE is added to the acknowledge response fed back to the UE, thereby further reducing signaling overheads.

With reference to the first aspect or any possible implementation of the first aspect, in a seventh possible implementation of the first aspect, after the receiving, by the UE, an access network dedicated identifier of the UE from the access network node, the method further includes: starting, by the UE, a first timer, where the access network dedicated identifier of the UE is within the validity period before the first timer times out.

Maintenance is performed on a timer, to determine, according to whether the timer times out, whether to disconnect an RRC connection.

With reference to the seventh possible implementation of the first aspect, in an eighth possible implementation of the first aspect, after the starting, by the UE, a first timer, the method further includes: restarting, by the UE, the first timer after sending the uplink data to the access network node; or restarting, by the UE, the first timer after receiving downlink data from the access network node.

In the foregoing manner, the RRC connection is maintained when there is data being transmitted, and the RRC connection is disconnected when there is no data being transmitted for a long time, to implement effective management of the RRC connection.

According to a second aspect, an RRC connection management method is provided. The method includes: receiving, by an access network node, an uplink data request from user equipment (UE) when in an RRC idle mode by using a shared data sending resource, where the uplink data request includes uplink data and request information that is used for requesting to enter an RRC connected mode; establishing, by the access network node, an RRC connection to the UE according to the request information, and determining an access network dedicated identifier of the UE; and sending, by the access network node, the access network dedicated identifier of the UE to the UE, where the UE is in the RRC connected mode within a validity period of the access network dedicated identifier of the UE.

In a first possible implementation of the second aspect, the request information includes a NAS ID of the UE and first indication information that is used for requesting to establish an RRC connection. Correspondingly, the establishing, by the access network node, an RRC connection to the UE according to the request information, and determining an access network dedicated identifier of the UE includes: establishing, by the access network node, the RRC connection to the UE according to the first indication information, and allocating the access network dedicated identifier of the UE that corresponds to the NAS ID to the UE.

With reference to the first possible implementation of the second aspect, in a second possible implementation of the second aspect, security protection is performed on the uplink data by using a first security parameter obtained through negotiation between the UE and a core network node. The first security parameter and a second security parameter are determined through negotiation between the UE and the core network node, the first security parameter is used for performing security protection on the uplink data, and the second security parameter is used for performing security protection on NAS signaling.

In a third possible implementation of the second aspect, the request information includes: the access network dedicated identifier used by the UE in the RRC connected mode before entering the RRC idle mode and second indication information that is used for resuming an RRC connection.

Correspondingly, the establishing, by the access network node, an RRC connection to the UE according to the request information, and determining an access network dedicated identifier of the UE includes: resuming, by the access network node, an RRC connection to the UE according to the second indication information, and reusing the access network dedicated identifier of the UE.

With reference to the third possible implementation of the second aspect, in a fourth possible implementation of the second aspect, security protection is performed on the uplink data by using a target security parameter obtained through negotiation between the UE and the access network node. Correspondingly, before the receiving, by an access network node, an uplink data request from UE when in an RRC idle mode by using a shared data sending resource, the method further includes: negotiating, by the access network node, with the UE in the RRC connected mode before the UE enters the RRC idle mode on a target security parameter to be used next time the UE enters the RRC connected mode, where the target security parameter has not been used previously in the RRC connected mode.

With reference to the second aspect or any possible implementation of the second aspect, in a fifth possible implementation of the second aspect, the sending, by the access network node, the access network dedicated identifier of the UE to the UE includes: sending, by the access network node, an acknowledge response to the UE. The acknowledge response is used for indicating that the access network node acknowledges that the uplink data has been received, and the acknowledge response includes the access network dedicated identifier of the UE or the access network dedicated identifier of the UE and security parameter acknowledge information.

With reference to the second aspect or any possible implementation of the second aspect, in a sixth possible implementation of the second aspect, after the sending, by the access network node, the access network dedicated identifier of the UE to the UE, the method further includes: starting, by the access network node, a second timer, where the access network dedicated identifier of the UE is within the validity period before the second timer times out.

With reference to the sixth possible implementation of the second aspect, in a seventh possible implementation of the second aspect, after the starting, by the access network node, a second timer, the method further includes: restarting, by the access network node, the second timer after sending downlink data to the UE; or restarting, by the access network node, the second timer after receiving the uplink data from the UE.

With reference to the sixth possible implementation of the second aspect, in an eighth possible implementation of the second aspect, after the starting, by the access network node, a second timer, the method further includes: sending, by the access network node, notification information to an MME after the second timer times out. The notification information is used for instructing the MME to release a signaling connection between the MME and the access network node and a dedicated data bearer, between the MME and a GW, of the UE.

The method on the access network node side corresponds to the method on the UE side, and technical effects achieved by using the methods are the same as or similar to each other.

According to a third aspect, an RRC connection management apparatus is provided. The apparatus is applied to UE. Functional units included in the apparatus are configured to implement the method according to the first aspect.

According to a fourth aspect, an RRC connection management apparatus is provided. The apparatus is applied to an access network node. Functional units included in the apparatus are configured to implement the method according to the second aspect.

According to a fifth aspect, UE is provided. The UE includes: a processor, a memory, and a transceiver. The memory is configured to store one or more instructions. The instructions are configured for execution by the processor, and the instructions are used for implementing the method according to the first aspect.

According to a sixth aspect, an access network node is provided. The access network node includes: a processor, a memory, and a transceiver. The memory is configured to store one or more instructions. The instructions are configured for execution by the processor, and the instructions are used for implementing the method according to the second aspect.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following describes the embodiments of the present disclosure with reference to the accompanying drawings.

Figure 1:
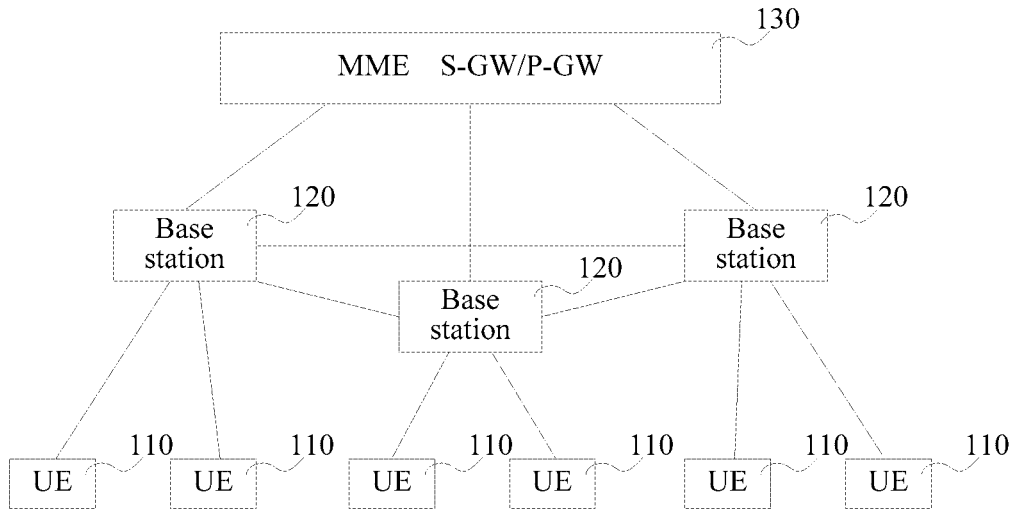
FIG. 1 is a schematic diagram of an implementation environment according to an embodiment of the present disclosure.

Referring to FIG. 1, FIG. 1 is a schematic diagram of an implementation environment according to an embodiment of the present disclosure. The implementation environment includes: UE 110, an access network node 120, and a core network node 130.

The UE 110 may include a handheld device (such as a mobile phone), an in-vehicle device, a wearable device, a computing device, or another processing device connected to a wireless modem, that has a wireless communication function, and various forms of user equipments (UEs), mobile stations (MS), terminals, terminal equipments (TE), and the like. For ease of description, such a device or equipment is briefly referred to as user equipment or UE in this application.

The access network node 120 is a network element in an access network. As shown in FIG. 1, using a Universal Mobile Telecommunications System (UMTS) as an example, the access network node 120 may be a NodeB, or may be a radio network controller (RNC) (not shown in the figure). In a long term evolution (LTE) wireless network architecture, a base station is an evolved NodeB (eNB).

The core network node 130 is a network element in a core network (CN). As shown in FIG. 1, using an LTE wireless network architecture as an example, the core network node 130 includes an MME and a serving gateway (S-GW)/PDN gateway (P-GW). The MME is mainly configured to complete mobility management and session management of the UE 110. The S-GW is mainly responsible for forwarding data between the eNB and the P-GW. The P-GW is mainly responsible for processing an internet protocol (IP) data service.

In the implementation environment shown in FIG. 1, description is provided merely by using the fourth generation of mobile phone mobile communication technology standards (4G). The technical solutions provided in the present disclosure are also applicable to another existing type of wireless communications network or a future wireless communications network, for example, a fifth generation mobile communications technology standard (5G) network.

Figure 2:
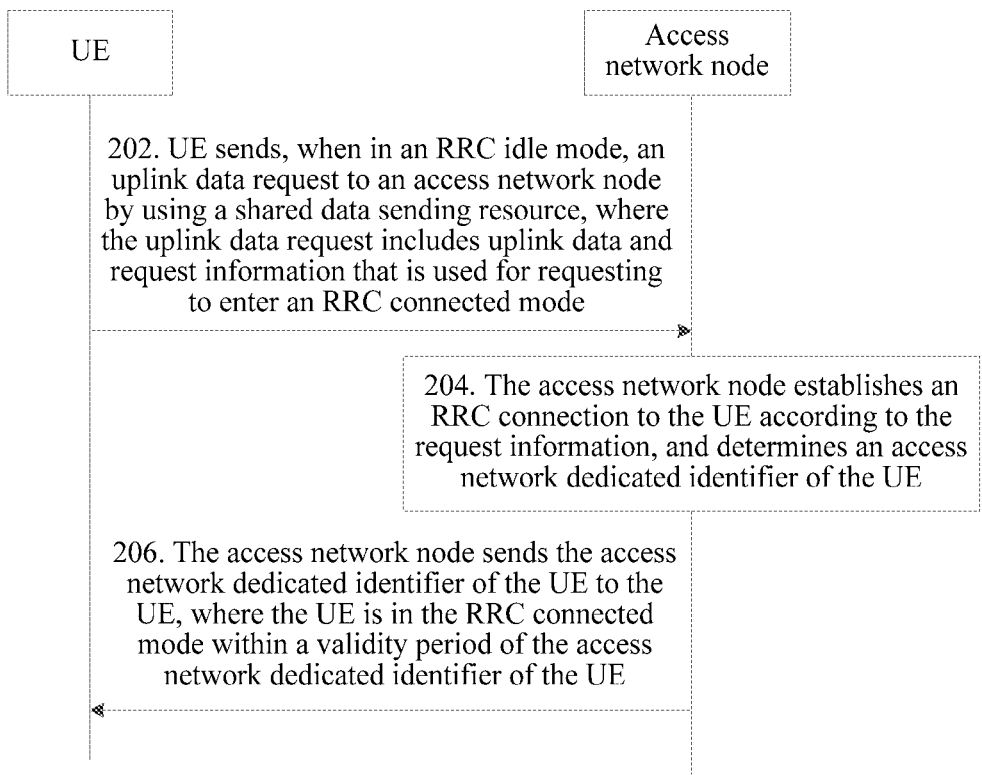
FIG. 2 is a flowchart of an RRC connection management method according to an embodiment of the present disclosure.

Referring to FIG. 2, FIG. 2 is a flowchart of an RRC connection management method according to an embodiment of the present disclosure. The method may be applied to the implementation environment shown in FIG. 1. The method may include the following steps.

Step 202. UE sends, when in an RRC idle mode, an uplink data request to an access network node by using a shared data sending resource, where the uplink data request includes uplink data and request information that is used for requesting to enter an RRC connected mode.

Extensibly, the RRC idle mode in this embodiment of the present disclosure may be a power saving mode in which the access network dedicated identifier of the UE is stored. That is, the RRC idle mode in this embodiment of the present disclosure is different from a traditional RRC idle mode. The UE in the traditional RRC idle mode releases all context information (including the access network dedicated identifier of the UE) of the RRC connected mode. In this embodiment of the present disclosure, when the UE is in the RRC idle mode, some context information of the RRC connected mode may be stored, such as the access network dedicated identifier of the UE.

Correspondingly, the access network node receives the uplink data request from the UE.

Step 204. The access network node establishes an RRC connection to the UE according to the request information, and determines an access network dedicated identifier of the UE.

Step 206. The access network node sends the access network dedicated identifier of the UE to the UE, where the UE is in the RRC connected mode within a validity period of the access network dedicated identifier of the UE.

Correspondingly, the UE receives the access network dedicated identifier of the UE from the access network node.

In another possible implementation, the uplink data request sent by the UE to the access network node does not include the request information that is used for requesting to enter the RRC connected mode. That is, the UE sends, by using the shared data sending resource, the uplink data request that carries the uplink data to the access network node, as an implicit manner of requesting to enter the RRC connected mode. Correspondingly, after receiving the uplink data request from the UE by using the shared data sending resource, the access network node establishes the RRC connection to the UE, and determines the access network dedicated identifier of the UE. For example, an access network dedicated identifier is allocated to UE without any access network dedicated identifier.

In conclusion, according to the method provided in this embodiment, the UE sends, when in the RRC idle mode, the uplink data request to the access network node by using the shared data sending resource, where the uplink data request includes both the uplink data and the request information that is used for requesting to enter the RRC connected mode, so that the access network node establishes an RRC connection to the UE according to the request information. This resolves the problem of low efficiency in the solution provided in the prior art. The problem is caused because the UE requests, in a process in which the UE switches from the RRC idle mode to the RRC connected mode, a base station to resume the RRC connection by using an RRC message, and signaling interaction of a large quantity of steps is needed between the UE and the base station to resume data transmission. The UE requests to enter the RRC connected mode while sending the uplink data, thereby reducing signaling overheads required for establishing or resuming an RRC connection, and achieving a technical effect of rapidly and efficiently establishing or resuming an RRC connection.

The embodiments of the present disclosure provide two solutions in which UE rapidly enters an RRC connected mode. In the following embodiment shown in FIG. 3, UE in an RRC idle mode requests to establish an RRC connection while sending uplink data to an access network node. In a small packet transmission scenario, the RRC connection that the UE requests to establish may be referred to as a lightweight RRC connection (that is, a light RRC connection). In the following embodiment shown in FIG. 4, UE in an RRC idle mode requests to resume an RRC connection while sending uplink data to an access network node. The RRC connection that the UE requests to resume is an RRC connection used previously in an RRC connected mode before the UE enters the RRC idle mode. The foregoing two solutions are described and illustrated respectively by using two embodiments of FIG. 3 and FIG. 4.

Figure 3:
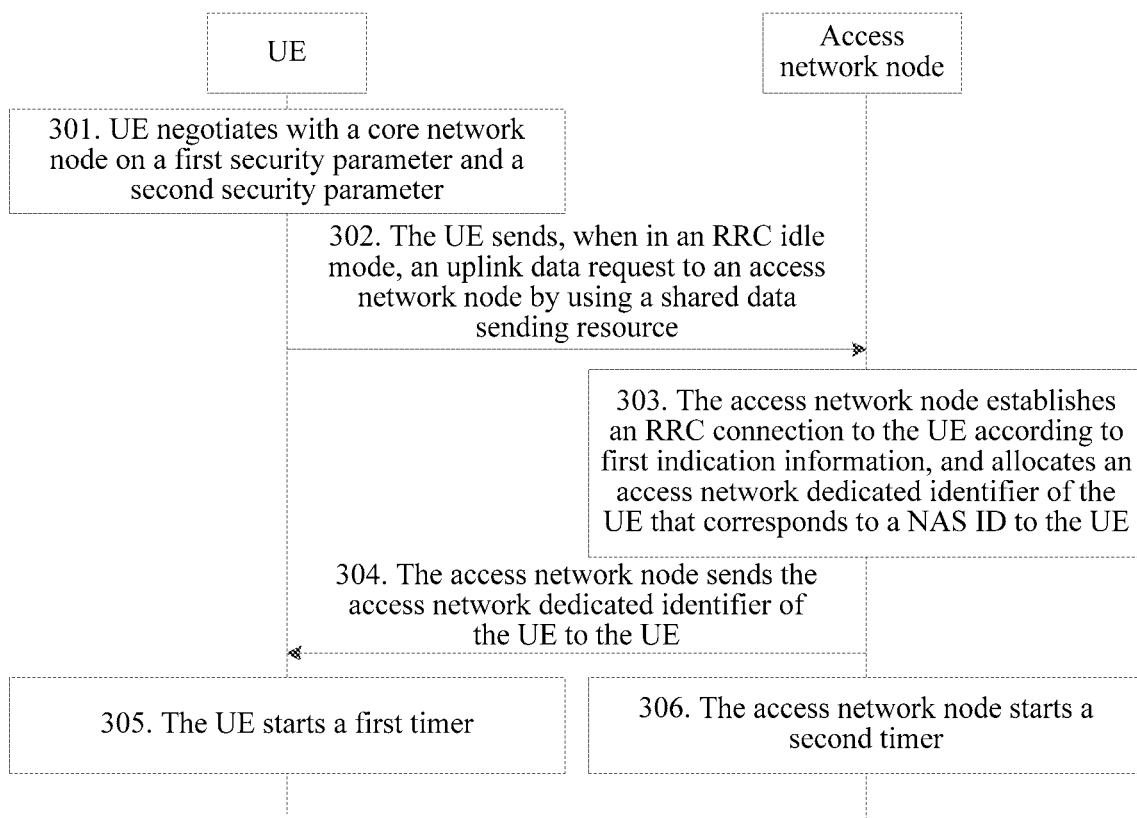
FIG. 3 is a flowchart of an RRC connection management method according to another embodiment of the present disclosure.

Referring to FIG. 3, FIG. 3 is a flowchart of an RRC connection management method according to another embodiment of the present disclosure. This embodiment is described by using an example in which the method is applied to the implementation environment shown in FIG. 1. The method may include the following steps.

Step 301. UE negotiates with a core network node on a first security parameter and a second security parameter.

The first security parameter is used for performing security protection on the uplink data. The uplink data may be uplink user plane data, or uplink control plane signaling. The first security parameter includes but is not limited to at least one of the following parameters: an encryption algorithm, a key corresponding to an encryption algorithm, an integrity protection algorithm, or a key corresponding to an integrity protection algorithm. The second security parameter is used for performing security protection on NAS signaling. In this embodiment, the UE negotiates with the core network node on a security parameter. The core network node may be an MME or a GW.

Extensibly, the first security parameter is used by the UE when sending uplink data to the access network node by using the shared data sending resource, and the second security parameter is used by the UE when sending uplink data to the access network node by using a dedicated data sending resource. This implements security isolation by using two different encryption modes when the UE requests to enter the RRC connected mode and after the UE enters the RRC connection mode.

Step 302. The UE sends, when in an RRC idle mode, an uplink data request to an access network node by using a shared data sending resource.

The uplink data request includes the uplink data and request information that is used for requesting to enter the RRC connected mode. In this embodiment, the request information includes: a NAS ID of the UE and first indication information that is used for requesting to establish an RRC connection. For example, the NAS ID may be an S-temporary mobile subscriber identity (S-TMSI) or an IP address.

In addition, in the prior art, when in the RRC idle mode, if the UE needs to send uplink data to the access network node, the UE first needs to send a scheduling request to the access network node. The scheduling request is used for requesting the access network node to allocate a data sending resource. Subsequently, the UE sends uplink data to the access network node by using the allocated data sending resource. Different from the prior art, in this embodiment, the access network node allocates a group of shared data sending resources (also referred to as a shared resource pool) to UE in a cell in advance. When the UE needs to send uplink data to the access network node, the UE selects a data sending resource from the foregoing shared resource pool allocated in advance, and sends an uplink data request to the access network node by using the selected data sending resource. Optionally, the access network node allocates a shared data sending resource to a group of UEs in a cell. The UEs use the shared data sending resource to send an uplink data request.

In an example, the data sending resource is a physical uplink shared channel (PUSCH). The access network node may allocate a group of shared PUSCH resources to UEs in a cell in advance by using a system information block (SIB) message. When there is uplink data being transmitted, UE in the RRC idle mode selects, according to a preset rule, a PUSCH from the foregoing PUSCH resource allocated in advance, and sends an uplink data request to the access network node by using the selected PUSCH.

Correspondingly, the access network node receives the uplink data request from the UE.

Optionally, to ensure security of the uplink data, the UE performs security protection on the uplink data by using the first security parameter obtained through negotiation between the UE and the core network node.

Step 303. The access network node establishes an RRC connection to the UE according to first indication information, and allocates an access network dedicated identifier of the UE that corresponds to a NAS ID to the UE.

In this embodiment, after receiving the uplink data request from the UE, the access network node establishes, according to the first indication information, the RRC connection, that is, the light RRC connection described above, to the UE. In addition, the access network node allocates the access network dedicated identifier to the UE. The access network dedicated identifier of the UE may be a radio network temporary identifier (RNTI). The RNTI may be unique in a cell, that is, the RNTI is a cell radio network temporary identifier (C-RNTI), or the RNTI may be unique in a plurality of cells. In addition, the access network node stores a correspondence between the NAS ID of the UE and the access network dedicated identifier.

Step 304. The access network node sends the access network dedicated identifier of the UE to the UE.

Correspondingly, the UE receives the access network dedicated identifier from the access network node. The UE is in the RRC connected mode within a validity period of the access network dedicated identifier of the UE.

In a possible implementation, the access network node adds the access network dedicated identifier of the UE to an acknowledge response fed back to the UE. Specifically, the access network node sends the acknowledge response to the UE. The acknowledge response is used for indicating that the access network node acknowledges that the uplink data has been received. The acknowledge response includes the access network dedicated identifier of the UE. Correspondingly, the UE receives the acknowledge response from the access network node.

Optionally, the access network node sends the access network dedicated identifier of the UE by using a physical downlink shared channel (PDSCH), and sends information such as the NAS ID of the UE by using a physical downlink control channel (PDCCH) or the PDSCH. The UE may determine, according to the NAS ID, whether the acknowledge response is sent to the UE, and stores the access network dedicated identifier of the UE if the UE determines that the acknowledge response is sent to the UE.

Optionally, the UE sends acknowledgment information to the access network node. The acknowledgment information is used for indicating that the UE acknowledges that the access network dedicated identifier of the UE has been received. Correspondingly, the access network node receives the acknowledgment information from the UE.

In addition, after receiving the access network dedicated identifier of the UE from the access network node, the UE further performs step 305 as follows:

Step 305. The UE starts a first timer.

For an occasion on which the UE starts the first timer, there are two possible implementations as follows: In a first implementation, the UE starts the first timer after receiving the access network dedicated identifier of the UE from the access network node and before sending acknowledgment information to the access network node. In a second implementation, the UE starts the first timer when or after sending acknowledgment information to the access network node.

Before the first timer times out, the UE is in the RRC connected mode, and the access network dedicated identifier of the UE is within the validity period. In addition, when the UE is in the RRC connected mode, the UE restarts the first timer after sending the uplink data to the access network node; or the UE restarts the first timer after receiving downlink data from the access network node, to ensure that the RRC connection is maintained if there is data being transmitted.

After the first timer times out, the UE releases the access network dedicated identifier, and switches from the RRC connected mode to the RRC idle mode.

Similarly, after sending the access network dedicated identifier of the UE to the UE, the access network node further performs step 306 as follows:

Step 306. The access network node starts a second timer.

For an occasion on which the access network node starts the second timer, there are two possible implementations as follows: In a first implementation, the access network node starts the second timer when or after sending the access network dedicated identifier of the UE to the UE. In a second implementation, the access network node starts the second timer after receiving acknowledgment information from the UE.

Before the second timer times out, the access network node considers that the UE is in the RRC connected mode and the access network dedicated identifier of the UE is within the validity period. In addition, when the UE is in the RRC connected mode, the access network node restarts the second timer after sending downlink data to the UE; or the access network node restarts the second timer after receiving the uplink data from the UE, to ensure that the RRC connection is maintained if there is data being transmitted.

After the second timer times out, the access network node releases the access network dedicated identifier, and considers that the UE switches from the RRC connected mode to the RRC idle mode. In addition, after the second timer times out, the access network node further sends notification information to an MME. The notification information is used for instructing the MME to release a signaling connection between the MME and the access network node and a dedicated data bearer, between the MME and a GW, of the UE.

In addition, within the validity period of the access network dedicated identifier, that is, when the UE is in the RRC connected mode, the UE may move between cells. Therefore, to ensure validity of the access network dedicated identifier of the UE, the UE sends an identifier re-determining request to the access network node if the UE moves outside n cells corresponding to the access network dedicated identifier of the UE. The access network dedicated identifier of the UE is unique in the n cells, and n is a positive integer. The identifier re-determining request is used for requesting the access network node to re-determine the access network dedicated identifier of the UE. Optionally, the identifier re-determining request and the uplink data are jointly sent, or the identifier re-determining request is sent in a form of a MAC layer control packet. For example, when there is uplink data being sent, the UE adds the identifier re-determining request to a data packet of the uplink data. When there is no uplink data being sent, the UE sends a MAC layer control packet to the access network node, to request the access network node to reallocate an access network dedicated identifier of the UE.

In conclusion, according to the method provided in this embodiment, the UE sends, when in the RRC idle mode, the uplink data request to the access network node by using the shared data sending resource, where the uplink data request includes both the uplink data and the request information that is used for requesting to enter the RRC connected mode, so that the access network node establishes an RRC connection to the UE according to the request information. This resolves the problem of low efficiency in the solution provided in the prior art. The problem is caused because the UE requests, in a process in which the UE switches from the RRC idle mode to the RRC connected mode, a base station to resume the RRC connection by using an RRC message, and signaling interaction of a large quantity of steps is needed between the UE and the base station to resume data transmission. The UE requests to enter the RRC connected mode while sending the uplink data, thereby reducing signaling overheads required for establishing or resuming an RRC connection, and achieving a technical effect of rapidly and efficiently establishing or resuming an RRC connection.

In this embodiment, the UE in the RRC idle mode requests to establish a lightweight RRC connection while sending uplink data to the access network node, thereby implementing rapid and efficient data sending and connection establishment.

In addition, the UE negotiates with the core network node on the first security parameter, and performs security protection on the uplink data by using the first security parameter, thereby ensuring security of the uplink data.

Figure 4:
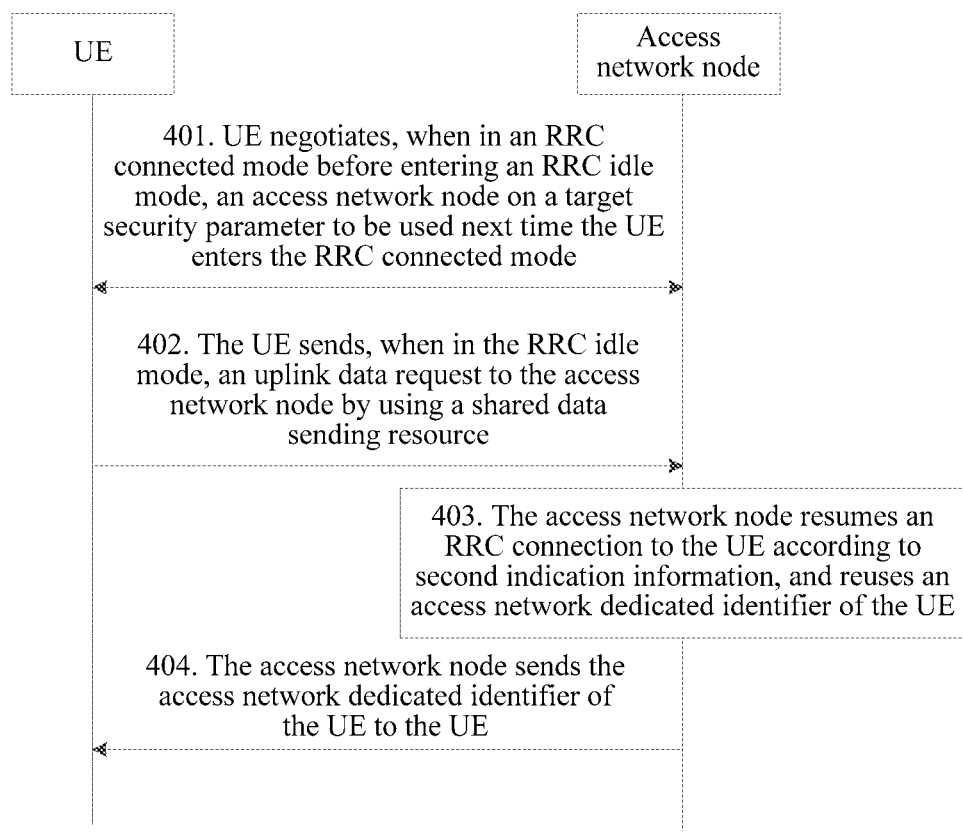
FIG. 4 is a flowchart of an RRC connection management method according to another embodiment of the present disclosure.

Referring to FIG. 4, FIG. 4 is a flowchart of an RRC connection management method according to another embodiment of the present disclosure. This embodiment is described by using an example in which the method is applied to the implementation environment shown in FIG. 1. The method may include the following steps.

Step 401. UE negotiates, when in an RRC connected mode before entering an RRC idle mode, with an access network node on a target security parameter to be used next time the UE enters the RRC connected mode.

Different from the embodiment shown in FIG. 3, in this embodiment, the UE and the access network node negotiate on a security parameter. For example, when or before the access network node instructs the UE to enter the RRC idle mode, the access network node and the UE deduce a target security parameter to be used next time the UE enters the RRC connected mode. The target security parameter has not been used previously in the RRC connected mode. After entering the RRC connected mode, the UE resumes a radio configuration parameter used previously in the RRC connected mode.

In a possible implementation, the UE and the access network node proactively negotiate with each other to determine the target security parameter. In another possible implementation, the MME instructs the UE and the access network node to determine the target security parameter through negotiation. In an example, the UE and the access network node may deduce, based on an existing base station key, a key for protecting user plane data and a key for protecting control plane signaling that are used next time the UE enters the RRC connected mode.

In this embodiment, after the UE switches from the RRC connected mode to the RRC idle mode, the access network node stores context information of the UE.

Step 402. The UE sends, when in the RRC idle mode, an uplink data request to the access network node by using a shared data sending resource.

The uplink data request includes uplink data and request information that is used for requesting to enter the RRC connected mode. In this embodiment, the request information includes an access network dedicated identifier used by the UE in the RRC connected mode before entering the RRC idle mode and second indication information that is used for resuming an RRC connection. Different from the embodiment shown in FIG. 3, in this embodiment, the UE requests to resume a previous RRC connection while sending uplink data to the access network node. Therefore, the UE continues to use the access network dedicated identifier used previously in the RRC connected mode. In addition, the uplink data request may be sent in a form of a MAC packet.

Correspondingly, the access network node receives the uplink data request from the UE.

Optionally, to ensure security of the uplink data, the UE performs security protection on the uplink data by using the target security parameter obtained through negotiation between the UE and the access network node.

Optionally, the uplink data request further includes security parameter indication information. The security parameter indication information is used for indicating a security parameter used by the UE. For example, the security parameter indication information may be an identifier of the target security parameter, and include one of the following parameters: a key identifier or an algorithm identifier. In addition, if the UE does not provide any security parameter indication information to the access network node, the access network node subsequently selects, by default, an unused key that is previously deduced and a previously used data security algorithm.

Optionally, the UE may deduce, based on a key previously in the RRC connected mode (for example, a base station key previously in the RRC connected mode), a key in a security parameter used in the RRC connected mode that the UE currently requests to enter. Correspondingly, the uplink data request further includes a key deduction parameter. The key deduction parameter is used for indicating a manner in which the UE deduces a key. The access network node may further deduce, based on the key and the key deduction parameter previously in the RRC connected mode, a key in a security parameter used in the RRC connected mode that the UE currently requests to enter.

Optionally, the UE may perform integrity protection on all or some information included in the uplink data request. The access network node correspondingly performs an integrity check, and sends an acknowledge response to the UE only after the check is successful.

Step 403. The access network node resumes an RRC connection to the UE according to second indication information, and reuses an access network dedicated identifier of the UE.

In this embodiment, after receiving the uplink data request from the UE, the access network node resumes the RRC connection to the UE according to the second indication information. In addition, the access network node reuses context information of the UE and the access network dedicated identifier of the UE.

Step 404. The access network node sends the access network dedicated identifier of the UE to the UE.

Correspondingly, the UE receives the access network dedicated identifier from the access network node. The UE is in the RRC connected mode within a validity period of the access network dedicated identifier of the UE.

In a possible implementation, the access network node sends the acknowledge response to the UE. The acknowledge response is used for indicating that the access network node acknowledges that the uplink data has been received, and the acknowledge response includes the access network dedicated identifier of the UE or the access network dedicated identifier of the UE and security parameter acknowledge information. Correspondingly, the UE receives the acknowledge response from the access network node. The security parameter acknowledge information is used for notifying the UE of a security parameter whose using currently in the RRC connected mode is acknowledged. Generally, the security parameter whose using is acknowledged is the target security parameter previously obtained through negotiation.

In addition, similar to the embodiment shown in FIG. 3, the timers may be separately maintained on the UE side and the access network node side, to determine, according to whether the timers time out, whether to disconnect the RRC connection.

Optionally, if the access network node determines that the RRC connection needs to be disconnected, the access network node may instruct, by using RRC signaling, the UE to release the RRC connection.

In addition, if the UE does not hand over between cells, the UE may directly initiate the foregoing uplink data request to an access network node of a current cell, to request the access network node to resume the RRC connection. If the UE hands over between cells (for example, the UE moves from a cell of origin to a target cell), the UE notifies an access network node or an MME in the target cell of related information of an access network node in the cell of origin, so that the access network node in the target cell obtains context information of the UE and address information of a GW from the access network node in the cell of origin. In addition, the access network node or the MME in the target cell, or the access network node or an MME in the cell or origin, notifies the GW of related information of the access network node in the target cell in which the UE is currently located, so that the GW accurately locates, when there is downlink data of the UE to be delivered, the target cell in which the UE is currently located, thereby ensuring that the downlink data is successfully delivered.

In conclusion, according to the method provided in this embodiment, the UE sends, when in the RRC idle mode, the uplink data request to the access network node by using the shared data sending resource, where the uplink data request includes both the uplink data and the request information that is used for requesting to enter the RRC connected mode, so that the access network node establishes an RRC connection to the UE according to the request information. This resolves the problem of low efficiency in the solution provided in the prior art. The problem is caused because the UE requests, in a process in which the UE switches from the RRC idle mode to the RRC connected mode, a base station to resume the RRC connection by using an RRC message, and signaling interaction of a large quantity of steps is needed between the UE and the base station to resume data transmission. The UE requests to enter the RRC connected mode while sending the uplink data, thereby reducing signaling overheads required for establishing or resuming an RRC connection, and achieving a technical effect of rapidly and efficiently establishing or resuming an RRC connection.

In this embodiment, the UE in the RRC idle mode requests to resume the RRC connection while sending uplink data to the access network node, thereby implementing rapid and efficient data sending and connection resumption.

In addition, the UE negotiates, when in the RRC connected mode, with the access network node on the target security parameter to be used next time the UE enters the RRC connected mode, and the target security parameter has not been used previously in the RRC connected mode, thereby ensuring that a different security parameter is used each time in the RRC connected mode to protect data, and implementing secure connection resumption. Compared with the prior art in which an original security parameter is still used to protect data after an RRC connection is resumed, the solution provided in this embodiment has higher security.

In addition, after the UE enters the RRC idle mode, a public data tunnel may be enabled between the base station and the GW. After the base station receives the uplink data from the UE, a dedicated data tunnel for the UE is established between the base station and the GW. After the UE enters the RRC idle mode, the base station and the MME may choose to release a control plane connection. After the base station receives the uplink data from the UE, the base station resumes establishment of the control plane connection to the MME.

Figure 5:
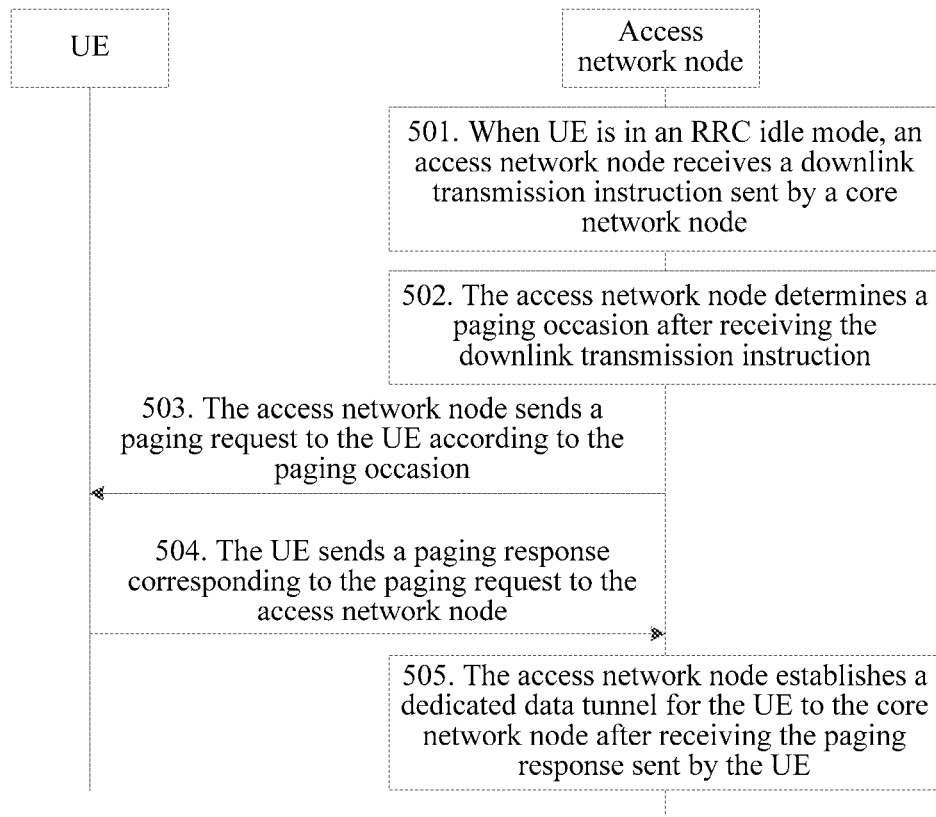
FIG. 5 is a flowchart of an RRC connection management method according to another embodiment of the present disclosure.

A process of sending the uplink data of the UE in the RRC idle mode is described and illustrated in the embodiments shown in FIG. 3 and FIG. 4. The following describes and illustrates a process of sending downlink data of the UE in the RRC idle mode by using the embodiment shown in FIG. 5.

Step 501. When UE is in an RRC idle mode, an access network node receives a downlink transmission instruction from a core network node.

In a possible implementation, a GW sends downlink data to an MME when there is downlink data of the UE to be delivered, and instructs the MME to send a downlink transmission instruction to the access network node. In another possible implementation, a GW sends a downlink transmission instruction to the access network node by using a public data tunnel between the GW and a base station when there is downlink data of the UE to be delivered by the GW.

The downlink transmission instruction includes at least the downlink data and a NAS ID (for example, an S-TMSI) of the UE. The NAS ID of the UE is used for indicating the UE to which the access network node sends the downlink data. Optionally, the downlink transmission instruction further includes a calculation parameter used by the access network node to calculate a paging occasion. For example, the calculation parameter may be a modulus value of an international mobile subscriber identity (IMSI) of the UE, for example, IMSI mod 1024.

Step 502. The access network node determines a paging occasion after receiving the downlink transmission instruction.

The UE in the RRC idle mode listens, at pre-determined time intervals, to information from the access network node. Two adjacent preset time intervals are the same or different. The access network node calculates the paging occasion according to a calculation parameter of a paging occasion. The paging occasion falls within a target time period in which the UE in the RRC idle mode listens to the information from the access network node.

For example, the access network node calculates the paging occasion according to IMSI mod 1024 and a discontinuous reception (DRX) parameter of the UE in the RRC idle mode. IMSI mod 1024 may be informed to the access network node by the core network node when sending the downlink transmission instruction to the access network node, or may be provided, to the access network node for storage, by the core network node when the UE switches from the RRC connected mode to the RRC idle mode.

Step 503. The access network node sends a paging request to the UE according to the paging occasion.

Correspondingly, the UE receives the paging request from the access network node.

In a possible implementation, the access network node stores an access network dedicated identifier of the UE. The access network node searches for the corresponding access network dedicated identifier of the UE according to the NAS ID of the UE, and pages the UE based on the access network dedicated identifier of the UE. Correspondingly, the UE determines, according to the access network dedicated identifier, that the paging request is sent to the UE.

In another possible implementation, when the UE switches from the RRC connected mode to the RRC idle mode, the access network node notifies the UE of a shared access network identifier. The shared access network identifier is an access network identifier shared by a plurality of UEs in a cell. In this case, the access network node pages the UE based on the shared access network identifier and the NAS ID of the UE. Correspondingly, the UE determines, according to the shared access network identifier and the NAS ID of the UE, that the paging request is sent to the UE.

Step 504. The UE sends a paging response corresponding to the paging request to the access network node.

After successfully receiving the paging request from the access network node, the UE responds to the paging request, to notify the access network node that the UE is ready to receive the downlink data.

Optionally, if the UE has not released the access network dedicated identifier, the UE adds the access network dedicated identifier of the UE to the paging response. If the UE has released the access network dedicated identifier, the UE adds the NAS ID of the UE to the paging response, and requests the access network node to reallocate an access network dedicated identifier to the UE.

Correspondingly, the access network node receives the paging response from the UE.

Step 505. The access network node establishes a dedicated data tunnel for the UE to the core network node after receiving the paging response from the UE.

After receiving the paging response from the UE, the base station establishes a dedicated data tunnel for the UE to the GW.

In addition, in a possible implementation, after receiving the paging response from the UE, the access network node sends downlink data to the UE. In another possible implementation, the access network node adds the downlink data to the paging request when sending the paging request to the UE, thereby reducing an interaction step.

Optionally, if the UE and the base station negotiate with each other on a security parameter by using the solution provided in the embodiment shown in FIG. 4, the base station may perform security protection on the downlink data by using the target security parameter obtained through negotiation between the base station and the UE. The base station may indicate, during sending of the downlink data, the used security parameter, for example, a key index value.

In this embodiment, when the UE is in the RRC idle mode, the access network node schedules the downlink data by calculating the paging occasion, thereby implementing rapid paging of the UE in a non-connected mode.

In addition, in the foregoing method embodiments, the steps on the UE side may be independently implemented as an RRC connection management method on the UE side, and the steps on the access network node side may be independently implemented as an RRC connection management method on the access network node side. In the foregoing method embodiments, the access network node is usually a base station.

The following is apparatus embodiments of the present disclosure, and may be used to perform the method embodiments of the present disclosure. For details not disclosed in the apparatus embodiments of the present disclosure, refer to the method embodiments of the present disclosure.

Figure 6A:
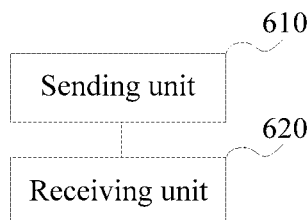
FIG. 6A is a block diagram of an RRC connection management apparatus according to an embodiment of the present disclosure.

Referring to FIG. 6A, FIG. 6A is a block diagram of an RRC connection management apparatus according to an embodiment of the present disclosure. The apparatus may be implemented as one part of UE or entire UE by using a hardware circuit or a combination of software and hardware. The apparatus may include: a sending unit 610 and a receiving unit 620.

The sending unit 610 is configured to send, when in an RRC idle mode, an uplink data request to an access network node by using a shared data sending resource. The uplink data request includes uplink data and request information that is used for requesting to enter an RRC connected mode.

The receiving unit 620 is configured to receive an access network dedicated identifier of the UE from the access network node. The access network dedicated identifier of the UE is determined by the access network node according to the request information, and the UE is in the RRC connected mode within a validity period of the access network dedicated identifier of the UE.

In conclusion, according to the apparatus provided in this embodiment, the UE sends, when in the RRC idle mode, the uplink data request to the access network node by using the shared data sending resource, where the uplink data request includes both the uplink data and the request information that is used for requesting to enter the RRC connected mode, so that the access network node establishes an RRC connection to the UE according to the request information. This resolves the problem of low efficiency in the solution provided in the prior art. The problem is caused because the UE requests, in a process in which the UE switches from the RRC idle mode to the RRC connected mode, a base station to resume the RRC connection by using an RRC message, and signaling interaction of a large quantity of steps is needed between the UE and the base station to resume data transmission. The UE requests to enter the RRC connected mode while sending the uplink data, thereby reducing signaling overheads required for establishing or resuming an RRC connection, and achieving a technical effect of rapidly and efficiently establishing or resuming an RRC connection.

In an optional embodiment provided based on the embodiment shown in FIG. 6A, the request information includes: a NAS ID of the UE and first indication information that is used for requesting to establish an RRC connection.

Figure 6B:
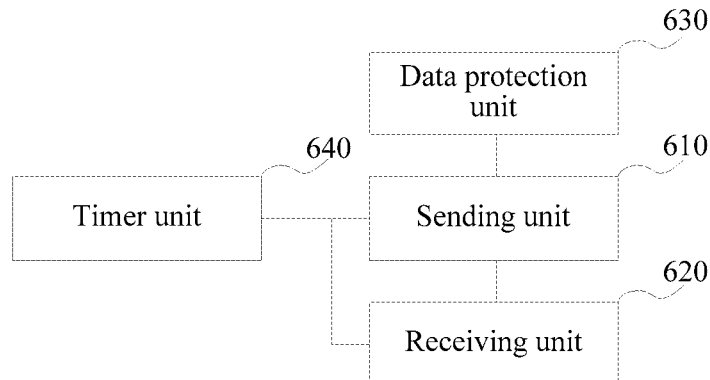
FIG. 6B is a block diagram of an RRC connection management apparatus according to another embodiment of the present disclosure.

Optionally, as shown in FIG. 6B, the apparatus further includes a data protection unit 630.

The data protection unit 630 is configured to: negotiate with a core network node on a first security parameter and a second security parameter, where the first security parameter is used for performing security protection on the uplink data, and the second security parameter is used for performing security protection on NAS signaling; and perform security protection on the uplink data by using the first security parameter.

In another optional embodiment provided based on the embodiment shown in FIG. 6A, the request information includes: the access network dedicated identifier used by the UE in the RRC connected mode before entering the RRC idle mode and second indication information that is used for resuming an RRC connection.

Optionally, as shown in FIG. 6B, the apparatus further includes a data protection unit 630.

The data protection unit 630 is configured to: negotiate, in the RRC connected mode before entering the RRC idle mode, with the access network node on a target security parameter to be used next time the UE enters the RRC connected mode, where the target security parameter has not been used previously in the RRC connected mode; and perform security protection on the uplink data by using the target security parameter.

In another optional embodiment provided based on the embodiment shown in FIG. 6A, the sending unit 610 is further configured to: send an identifier re-determining request to the access network node if the UE moves outside n cells corresponding to the access network dedicated identifier of the UE within the validity period of the access network dedicated identifier of the UE. The access network dedicated identifier of the UE is unique in the n cells, and n is a positive integer. The identifier re-determining request is used for requesting the access network node to re-determine the access network dedicated identifier of the UE. The identifier re-determining request and the uplink data are jointly sent, or the identifier re-determining request is sent in a form of a MAC layer control packet.

In another optional embodiment provided based on the embodiment shown in FIG. 6A, the receiving unit 620 is further configured to: receive an acknowledge response from the access network node. The acknowledge response is used for indicating that the access network node acknowledges that the uplink data has been received, and the acknowledge response includes the access network dedicated identifier of the UE or the access network dedicated identifier of the UE and security parameter acknowledge information.

In another optional embodiment provided based on the embodiment shown in FIG. 6A, as shown in FIG. 6B, the apparatus further includes a timer unit 640.

The timer unit 640 is configured to start a first timer after the receiving unit 610 receives the access network dedicated identifier of the UE from the access network node. The access network dedicated identifier of the UE is within the validity period before the first timer times out.

Optionally, the timer unit 640 is further configured to: restart the first timer after the sending unit 610 sends the uplink data to the access network node; or restart the first timer after the receiving unit 620 receives downlink data from the access network node.

Figure 7A:
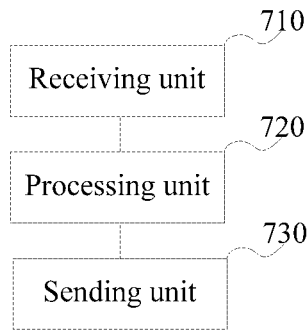
FIG. 7A is a block diagram of an RRC connection management apparatus according to another embodiment of the present disclosure.

Referring to FIG. 7A, FIG. 7A is a block diagram of an RRC connection management apparatus according to another embodiment of the present disclosure. The apparatus may be implemented as one part of an access network node or an entire access network node by using a hardware circuit or a combination of software and hardware. The apparatus may include: a receiving unit 710, a processing unit 720, and a sending unit 730.

The sending unit 710 is configured to receive an uplink data request from UE when in an RRC idle mode by using a shared data sending resource. The uplink data request includes uplink data and request information that is used for requesting to enter an RRC connected mode.

The processing unit 720 is configured to: establish an RRC connection to the UE according to the request information, and determine an access network dedicated identifier of the UE.

The sending unit 730 is configured to send the access network dedicated identifier of the UE to the UE. The UE is in the RRC connected mode within a validity period of the access network dedicated identifier of the UE.

In conclusion, according to the apparatus provided in this embodiment, the access network node receives the uplink data request that is sent by using the shared data sending resource by the UE when in the RRC idle mode, where the uplink data request includes both the uplink data and the request information that is used for requesting to enter the RRC connected mode, so that the access network node establishes an RRC connection to the UE according to the request information. This resolves the problem of low efficiency in the solution provided in the prior art. The problem is caused because the UE requests, in a process in which the UE switches from the RRC idle mode to the RRC connected mode, a base station to resume the RRC connection by using an RRC message, and signaling interaction of a large quantity of steps is needed between the UE and the base station to resume data transmission. The UE requests to enter the RRC connected mode while sending the uplink data, thereby reducing signaling overheads required for establishing or resuming an RRC connection, and achieving a technical effect of rapidly and efficiently establishing or resuming an RRC connection.

In an optional embodiment provided based on the embodiment shown in FIG. 7A, the request information includes: a NAS ID of the UE and first indication information that is used for requesting to establish an RRC connection.

Correspondingly, the processing unit 720 is configured to: establish the RRC connection to the UE according to the first indication information, and allocate the access network dedicated identifier of the UE that corresponds to the NAS ID to the UE.

Optionally, security protection is performed on the uplink data by using a first security parameter obtained through negotiation between the UE and a core network node. The first security parameter and a second security parameter are determined through negotiation between the UE and the core network node, the first security parameter is used for performing security protection on the uplink data, and the second security parameter is used for performing security protection on NAS signaling.

In another optional embodiment provided based on the embodiment shown in FIG. 7A, the request information includes: the access network dedicated identifier used by the UE in the RRC connected mode before entering the RRC idle mode and second indication information that is used for resuming an RRC connection.

Correspondingly, the processing unit 720 is configured to: resume an RRC connection to the UE according to the second indication information, and reuse the access network dedicated identifier of the UE.

Optionally, security protection is performed on the uplink data by using a target security parameter obtained through negotiation between the UE and the access network node. The processing unit 720 is further configured to negotiate with the UE in the RRC connected mode before the UE enters the RRC idle mode on a target security parameter to be used next time the UE enters the RRC connected mode, where the target security parameter has not been used previously in the RRC connected mode.

In another optional embodiment provided based on the embodiment shown in FIG. 7A, the sending unit 730 is further configured to send an acknowledge response to the UE. The acknowledge response is used for indicating that the access network node acknowledges that the uplink data has been received, and the acknowledge response includes the access network dedicated identifier of the UE or the access network dedicated identifier of the UE and security parameter acknowledge information.

Figure 7B:
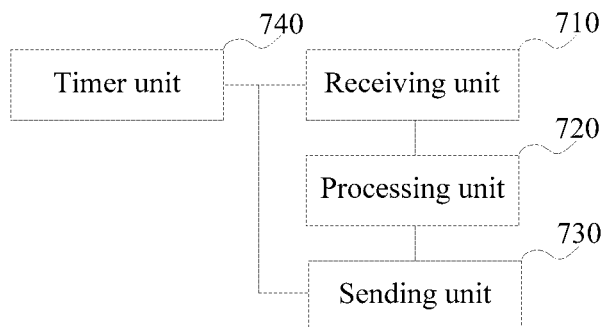
FIG. 7B is a block diagram of an RRC connection management apparatus according to another embodiment of the present disclosure.

In another optional embodiment provided based on the embodiment shown in FIG. 7A, as shown in FIG. 7B, the apparatus further includes a timer unit 740.

The timer unit 740 is configured to start a second timer after the sending unit 730 sends the access network dedicated identifier of the UE to the UE. The access network dedicated identifier of the UE is within the validity period before the second timer times out.

Optionally, the timer unit 740 is further configured to: restart the second timer after the sending unit 730 sends downlink data to the UE; or restart the second timer after the receiving unit 710 receives the uplink data from the UE.

Optionally, the sending unit 730 is further configured to send notification information to an MME after the second timer times out. The notification information is used for instructing the MME to release a signaling connection between the MME and the access network node and a dedicated data bearer, between the MME and a GW, of the UE.

Figure 8:
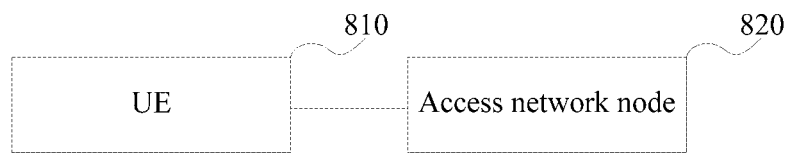
FIG. 8 is a block diagram of an RRC connection management system according to an embodiment of the present disclosure.

Referring to FIG. 8, FIG. 8 is a block diagram of an RRC connection management system according to an embodiment of the present disclosure. The system includes UE 810 and an access network node 820.

The UE 810 includes the RRC connection management apparatus provided in the embodiment shown in FIG. 6A or any optional embodiment of the embodiment shown in FIG. 6A.

The access network node 820 includes the RRC connection management apparatus provided in the embodiment shown in FIG. 7A or any optional embodiment of the embodiment shown in FIG. 7A.

It should be noted that when the apparatus provided in the foregoing embodiments implements functions of the apparatus, description is provided merely by using division of the foregoing functional units as an example. In an actual application, the functions may be allocated to different functional units as required for completion. That is, an internal structure of the device is divided into different functional units, to complete all or some of the functions described above. In addition, the apparatus provided in the foregoing embodiment belongs to a same concept as the method embodiment. For a specific implementation process of the apparatus, refer to the method embodiment. Details are not described herein again.

Figure 9:
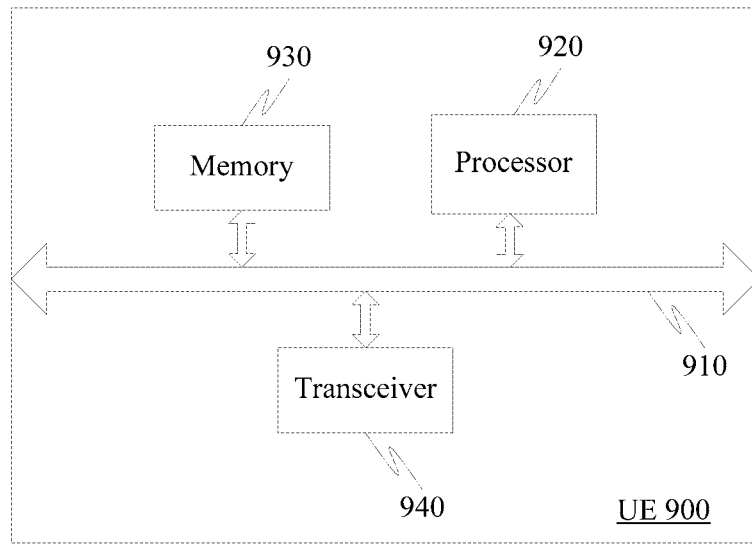
FIG. 9 is a block diagram of UE according to an embodiment of the present disclosure.

Referring to FIG. 9, FIG. 9 is a block diagram of UE according to an embodiment of the present disclosure. As shown in FIG. 9, the UE 900 includes: a bus 910, and a processor 920, a memory 930, and a transceiver 940 that communicate with each other by using the bus 910. The memory 930 is configured to store one or more instructions, and the instructions are configured to be executed by the processor 920.

The processor 920 is configured to control, when in a radio resource control (RRC) idle mode, the transceiver 940 to send an uplink data request to an access network node by using a shared data sending resource. The uplink data request includes uplink data and request information that is used for requesting to enter an RRC connected mode.

The processor 920 is further configured to control the transceiver 940 to receive an access network dedicated identifier of the UE from the access network node. The access network dedicated identifier of the UE is determined by the access network node according to the request information, and the UE is in the RRC connected mode within a validity period of the access network dedicated identifier of the UE.

In conclusion, the UE provided in this embodiment sends, when in the RRC idle mode, the uplink data request to the access network node by using the shared data sending resource, where the uplink data request includes both the uplink data and the request information that is used for requesting to enter the RRC connected mode, so that the access network node establishes an RRC connection to the UE according to the request information. This resolves the problem of low efficiency in the solution provided in the prior art. The problem is caused because the UE requests, in a process in which the UE switches from the RRC idle mode to the RRC connected mode, a base station to resume the RRC connection by using an RRC message, and signaling interaction of a large quantity of steps is needed between the UE and the base station to resume data transmission. The UE requests to enter the RRC connected mode while sending the uplink data, thereby reducing signaling overheads required for establishing or resuming an RRC connection, and achieving a technical effect of rapidly and efficiently establishing or resuming an RRC connection.

In an optional embodiment provided based on the embodiment shown in FIG. 9, the request information includes: a NAS ID of the UE and first indication information that is used for requesting to establish an RRC connection.

Optionally, the processor 920 is further configured to: negotiate with a core network node on a first security parameter and a second security parameter, where the first security parameter is used for performing security protection on the uplink data, and the second security parameter is used for performing security protection on NAS signaling; and perform security protection on the uplink data by using the first security parameter.

In another optional embodiment provided based on the embodiment shown in FIG. 9, the request information includes: the access network dedicated identifier used by the UE in the RRC connected mode before entering the RRC idle mode and second indication information that is used for resuming an RRC connection.

Optionally, the processor 920 is further configured to: negotiate, in the RRC connected mode before entering the RRC idle mode, with the access network node on a target security parameter to be used next time the UE enters the RRC connected mode, where the target security parameter has not been used previously in the RRC connected mode; and perform security protection on the uplink data by using the target security parameter.

In another optional embodiment provided based on the embodiment shown in FIG. 9, the processor 920 is further configured to: if the UE moves outside n cells corresponding to the access network dedicated identifier of the UE within the validity period of the access network dedicated identifier of the UE, control the transceiver 940 to send an identifier re-determining request to the access network node. The access network dedicated identifier of the UE is unique in the n cells, and n is a positive integer. The identifier re-determining request is used for requesting the access network node to re-determine the access network dedicated identifier of the UE. The identifier re-determining request and the uplink data are jointly sent, or the identifier re-determining request is sent in a form of a MAC layer control packet.

In another optional embodiment provided based on the embodiment shown in FIG. 9, the processor 920 is further configured to control the transceiver 940 to receive an acknowledge response from the access network node. The acknowledge response is used for indicating that the access network node acknowledges that the uplink data has been received, and the acknowledge response includes the access network dedicated identifier of the UE or the access network dedicated identifier of the UE and security parameter acknowledge information.

Based on another optional embodiment provided based on the embodiment shown in FIG. 9, the processor 920 is further configured to start a first timer after the access network dedicated identifier of the UE that is sent by the access network node is received. The access network dedicated identifier of the UE is within the validity period before the first timer times out.

Optionally, the processor 920 is further configured to: restart the first timer after the uplink data is sent to the access network node; or restart the first timer after downlink data is received from the access network node.

Figure 10:
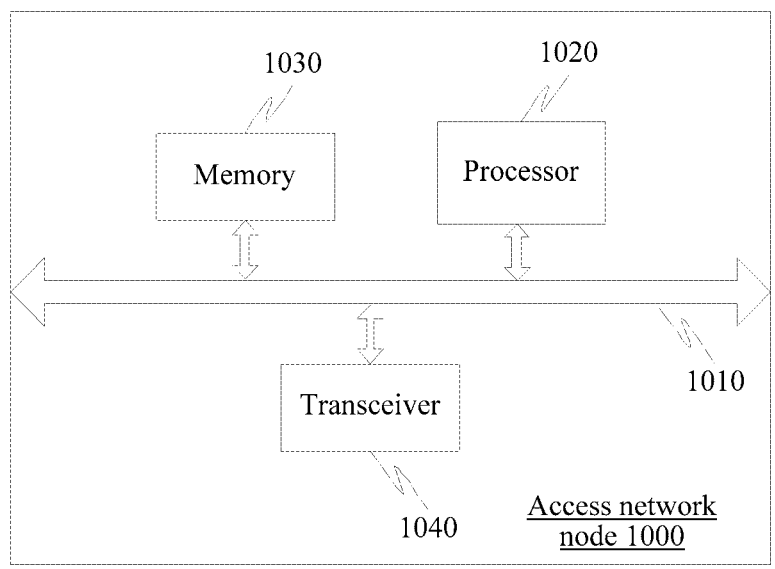
FIG. 10 is a block diagram of an access network node according to an embodiment of the present disclosure.

Referring to FIG. 10, FIG. 10 is a block diagram of an access network node according to an embodiment of the present disclosure. As shown in FIG. 10, the access network node 1000 includes: a bus 1010, and a processor 1020, a memory 1030, and a transceiver 1040 that communicate with each other by using the bus 1010. The memory 1030 is configured to store one or more instructions, and the instructions are configured to be executed by the processor 1020.

The processor 1020 is configured to control the transceiver 1040 to receive an uplink data request from UE when in an RRC idle mode by using a shared data sending resource. The uplink data request includes uplink data and request information that is used for requesting to enter an RRC connected mode.

The processor 1020 is further configured to: establish an RRC connection to the UE according to the request information, and determine an access network dedicated identifier of the UE.

The processor 1020 is further configured to control the transceiver 1040 to send the access network dedicated identifier of the UE to the UE. The UE is in the RRC connected mode within a validity period of the access network dedicated identifier of the UE.

In conclusion, the access network node provided in this embodiment receives the uplink data request that is sent by using the shared data sending resource by the UE when in the RRC idle mode, where the uplink data request includes both the uplink data and the request information that is used for requesting to enter the RRC connected mode, and subsequently establishes an RRC connection to the UE according to the request information. This resolves the problem of low efficiency in the solution provided in the prior art. The problem is caused because the UE requests, in a process in which the UE switches from the RRC idle mode to the RRC connected mode, a base station to resume the RRC connection by using an RRC message, and signaling interaction of a large quantity of steps is needed between the UE and the base station to resume data transmission. The UE requests to enter the RRC connected mode while sending the uplink data, thereby reducing signaling overheads required for establishing or resuming an RRC connection, and achieving a technical effect of rapidly and efficiently establishing or resuming an RRC connection.

In an optional embodiment provided based on the embodiment shown in FIG. 10, the request information includes: a NAS ID of the UE and first indication information that is used for requesting to establish an RRC connection.

Correspondingly, the processor 1020 is configured to: establish the RRC connection to the UE according to the first indication information, and allocate the access network dedicated identifier of the UE that corresponds to the NAS ID to the UE.

Optionally, security protection is performed on the uplink data by using a first security parameter obtained through negotiation between the UE and a core network node. The first security parameter and a second security parameter are determined through negotiation between the UE and the core network node, the first security parameter is used for performing security protection on the uplink data, and the second security parameter is used for performing security protection on NAS signaling.

In another optional embodiment provided based on the embodiment shown in FIG. 10, the request information includes: the access network dedicated identifier used by the UE in the RRC connected mode before entering the RRC idle mode and second indication information that is used for resuming an RRC connection.

Correspondingly, the processor 1020 is configured to: resume an RRC connection to the UE according to the second indication information, and reuse the access network dedicated identifier of the UE.

Optionally, security protection is performed on the uplink data by using a target security parameter obtained through negotiation between the UE and the access network node. The processor 1020 is further configured to negotiate with the UE in the RRC connected mode before the UE enters the RRC idle mode on a target security parameter to be used next time the UE enters the RRC connected mode, where the target security parameter has not been used previously in the RRC connected mode.

In another optional embodiment provided based on the embodiment shown in FIG. 10, the processor 1020 is further configured to control the transceiver to send an acknowledge response to the UE. The acknowledge response is used for indicating that the access network node acknowledges that the uplink data has been received, and the acknowledge response includes the access network dedicated identifier of the UE or the access network dedicated identifier of the UE and security parameter acknowledge information.

Based on another optional embodiment provided based on the embodiment shown in FIG. 10, the processor 1020 is further configured to start a second timer after the access network dedicated identifier of the UE is sent to the UE. The access network dedicated identifier of the UE is within the validity period before the second timer times out.

Optionally, the processor 1020 is further configured to: restart the second timer after downlink data is sent to the UE; or restart the second timer after the uplink data is received from the UE.

Optionally, the processor 1020 is further configured to control, after the second timer times out, the transceiver 1040 to send notification information to an MME. The notification information is used for instructing the MME to release a signaling connection between the MME and the access network node and a dedicated data bearer, between the MME and a GW, of the UE.

It should be understood that, unless the context clearly supports an exception, a singular form "one" ("a", "an", "the") used herein also intends to include a plural form. It should be further understood that "and/or" used herein intends to include any and all possible combinations of one or more correlated items that are listed.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A radio resource control (RRC) connection management method, comprising:
   negotiating, by user equipment (UE) in a first RRC mode before entering a second RRC mode in which a first access network dedicated identifier of the UE used in the first RRC mode is stored in the UE and which is different from the first RRC mode, with a first access network node to obtain a target security parameter, wherein the first RRC mode is a RRC connected mode and the target security parameter has not been used previously in the first RRC mode;
   performing, by the UE when in the second RRC mode, security protection on uplink data by using the target security parameter; and
   sending, by the UE when in the second RRC mode, request information and the uplink data, wherein the request information is used to request establishment or resumption of a RRC connection to the first access network node or a second access network node.

2. The method according to claim 1, further comprising:
   after establishing or resuming the RRC connection, restoring, by the UE, a radio configuration parameter used previously in the first RRC mode.

3. The method according to claim 1, wherein the security protection comprises integrity protection.

4. The method according to claim 1, further comprising:
   receiving, by the UE, a second access network dedicated identifier from the first access network node or the second access network node; and
   starting, by the UE, a first timer after receiving the second access network dedicated identifier;
   wherein the UE is in the RRC connected mode before the first timer expires.

5. The method according to claim 4, wherein when the UE is in the RRC connected mode, the method further comprises:
   restarting, by the UE, the first timer after sending the uplink data to the first access network node or the second access network node; or
   restarting, by the UE, the first timer after receiving downlink data from the first access network node or the second access network node.

6. The method according to claim 4, further comprising:
   releasing, by the UE, the RRC connection in response to expiry of the first timer.

7. The method according to claim 1, wherein the uplink data and the request information are sent by using a shared data resource.

8. A communications apparatus, comprising:
   a processor, configured to execute one or more instructions stored in a memory to cause the communications apparatus to perform steps comprising:
   negotiating, when a user equipment (UE) which the communications apparatus is or is a chipset for, is in a first RRC mode before entering a second RRC mode in which a first access network dedicated identifier of the UE used in the first RRC connected mode is stored in the UE and which is different from the first RRC mode, with a first access network node to obtain a target security parameter, wherein the first RRC mode is a RRC connected mode and the target security parameter has not been used in the first RRC mode;

performing, when the UE is in the second RRC mode, security protection on uplink data by using the target security parameter; and sending, when the UE is in the second RRC mode, request information and the uplink data, wherein the request information is used to request establishment or resumption of a RRC connection to the first access network node or a second access network node.

9. The apparatus according to claim 8, wherein the processor is further configured to execute the one or more instructions stored in the memory to cause the communications apparatus to perform steps further comprising:

after establishing or resuming the RRC connection, restoring, by the UE, a radio configuration parameter used previously in the first RRC mode.

10. The apparatus according to claim 8, wherein the security protection comprises integrity protection.

11. The apparatus according to claim 8, wherein the processor is further configured to execute the one or more instructions stored in the memory to cause the communications apparatus to perform steps further comprising:

receiving a second access network dedicated identifier from the first access network node or the second access network node; and starting a first timer after receiving the second access network dedicated identifier;

wherein the UE is in the RRC connected mode before the first timer expires.

12. The apparatus according to claim 11, wherein the processor is further configured to execute the one or more instructions stored in the memory, to cause the communications apparatus to perform steps further comprising:

when the UE is in the RRC connected mode, restarting the first timer after sending the uplink data to the first access network node or the second access network node; or restarting, by the UE, the first timer after receiving downlink data from the first access network node or the second access network node.

13. The apparatus according to claim 11, wherein the processor is further configured to execute the one or more instructions stored in the memory to cause the communications apparatus to perform steps further comprising:

releasing the RRC connection in response to expiry of the first timer.

14. The apparatus according to claim 8, wherein, the uplink data and the request information are sent by using a shared data resource.

15. The apparatus according to claim 8, wherein the processor is further configured to execute the one or more instructions stored in the memory to cause the communications apparatus to perform steps further comprising:

in response to the UE handing over from a first cell of the first access network node to a second cell of the second access network node, notifying the second access network node or a mobile management entity of information of the first access network node.

16. A communications apparatus, being a user equipment (UE), or, a chipset for the UE, comprising:

a processor, configured to execute one or more instructions stored in a memory to cause the communications apparatus to perform steps comprising:

receiving, from a first access network node, information indicating a target security parameter when the UE is in a first RRC mode before entering a second RRC mode in which a first access network dedicated identifier of the UE is stored in the UE and which is different from the first RRC mode, wherein the first RRC mode is a RRC connected mode and the target security parameter is unused before entering the second RRC mode;

performing, when the UE is in the second RRC mode, security protection on uplink data by using the target security parameter; and sending, when the UE is in the second RRC mode, request information and the uplink data, wherein the request information is used to request establishment or resumption of a RRC connection to the first access network node or a second access network node.

17. The apparatus according to claim 16, wherein the security protection comprises integrity protection.

18. The apparatus according to claim 16, wherein the processor is further configured to execute the one or more instructions stored in the memory to cause the communications apparatus to perform steps further comprising:

after establishing or resuming the RRC connection, restoring a radio configuration parameter used previously in the RRC connected mode.

19. A communications apparatus, comprising:

a processor, configured to execute one or more instructions stored in a memory to cause the communications apparatus to perform steps comprising:

sending, to user equipment (UE), information indicating a target security parameter wherein the UE is in a first RRC mode before entering a second RRC mode in which a first access network dedicated identifier of the UE is stored in the UE and which is different from the first RRC mode, and wherein the first RRC mode is a RRC connected mode and the target security parameter is unused before entering the second RRC mode;

receiving request information and uplink data from the UE being in the second RRC mode, wherein the request information is used to request establishment or resumption of a RRC connection, and wherein security protection on uplink data uses the target security parameter.

20. The apparatus according to claim 19, wherein the security protection comprises integrity protection.

21. A communications method, comprising:

sending, by a first access network node, to user equipment (UE), information indicating a target security parameter wherein the UE is in a first RRC mode before entering a second RRC mode in which a first access network dedicated identifier of the UE used in the first RRC mode is stored in the UE and which is different from the first RRC mode, and wherein the first RRC mode is a RRC connected mode and the target security parameter is unused before entering the second RRC mode;

receiving, by the first access network node or a second access network node, request information and uplink data from the UE being in the RRC mode, wherein the request information is used to request establishment or resumption of a RRC connection, and wherein security protection on uplink data uses the target security parameter.

22. The method according to claim 21, wherein the security protection comprises integrity protection.

23. The method according to claim 21, wherein the uplink data and the request information use a shared data resource.

24. The method according to claim 21, further comprising:

receiving, by the second access network node or a mobile management entity, a notification of information of the first access network node from the UE in response to the UE handing over from a first cell of the first access network node to a second cell of the second access network node.

\* \* \* \* \*